United States Patent [19]

Kimuta

[11] Patent Number: 5,165,731

[45] Date of Patent: Nov. 24, 1992

[54] PIPE FITTING HAVING A MULTI-FITTABLE THREAD

[75] Inventor: Yasuhito Kimuta, Soka, Japan

[73] Assignee: SMC Corporation, Tokyo, Japan

[21] Appl. No.: 430,584

[22] Filed: Nov. 1, 1989

[30] Foreign Application Priority Data

Nov. 1, 1988 [JP] Japan ............................. 63-276987

[51] Int. Cl.$^5$ ..................... F16L 5/00; F16L 15/00; F16B 33/00
[52] U.S. Cl. .................................. 285/220; 285/355; 411/369; 411/542
[58] Field of Search ............... 285/212, 220, 355, 918; 411/369, 544, 542, 370

[56] References Cited

U.S. PATENT DOCUMENTS

| | | | |
|---|---|---|---|
| 1,226,921 | 5/1917 | Stewart | 285/355 |
| 1,992,793 | 2/1935 | Welter | 285/355 |
| 2,187,217 | 1/1940 | Winslow | 285/355 |
| 2,342,425 | 2/1944 | Parker | 411/369 |
| 2,553,340 | 5/1951 | Smith | 285/355 |
| 3,074,748 | 1/1963 | Ulrich | 285/355 |
| 3,173,712 | 3/1965 | Zahuranec et al. | 285/355 |
| 3,323,402 | 6/1967 | Gowen, Jr. | |
| 3,376,053 | 4/1968 | Novakovich | 285/92 |
| 4,469,338 | 9/1984 | Legris | 277/236 |
| 4,531,767 | 7/1985 | Andreolla | 285/220 |

FOREIGN PATENT DOCUMENTS 0091844 10/1983 European Pat. Off. .
1027014 11/1952 Fed. Rep. of Germany .

Primary Examiner—Neill R. Wilson
Attorney, Agent, or Firm—Oblon, Spivak, McClelland, Maier & Neustadt

[57] ABSTRACT

A pipe joint for use with a pipe thread provided on a fluid apparatus has a thread designed to mesh with any of pipe threads of different types of the same nominal diameter. Design of the pipe joint is simple because the thread provides mechanical connection, whereas a separate sealing member provides a non-leaking union. The screw-in portion of the pipe joint has an external or an internal thread that meshes with the innermost or the outermost of commonly used mating pipe threads of different types having the same nominal diameter. The axial length of the thread is reduced to a minimum within the limit that the desired firm mechanical connection is secure.

6 Claims, 3 Drawing Sheets

PIPE FITTING HAVING A MULTI-FITTABLE THREAD

FIELD OF THE INVENTION

This invention relates to pipe joints to be screwed into pipe-connecting threads provided in various types of pressurized fluid apparatuses.

DESCRIPTION OF THE PRIOR ART

Pipe-connecting threads are cut in ports through which pressurized fluids are fed into and discharged from directional and other types of valves, piston cylinders and other fluid apparatuses.

For air piping, tapered pipe threads R, Rc and Rp and parallel pipe threads G according to ISO and JIS and tapered threads NPT and tight tapered threads NPTF for U.S. standard pipes according to ANSI, all being inch-based and classified as shown in the following table, have been used.

| Classification | Threads and Designations |
| --- | --- |
| Tapered pipe threads (R, Rc, Rp) | Tapered external thread R, Tapered internal thread Rc, Parallel internal thread Rp |
| Parallel pipe threads (G) | Parallel external thread G, Parallel internal thread G |
| Tapered threads for U.S. standard pipes (NPT) | Tapered external thread NPT Tapered internal thread NPT |
| Tight tapered threads for U.S. standard pipes (NPTF) | Tapered external thread NPTF Tapered internal thread NPTF |

The tapered pipe threads R, Rc, Rp and the tapered threads NPT for U.S. standard pipes are designed to secure leak tightness by bringing the faces of meshed external and internal threads into contact under pressure. Actually, however, some gap can be left between the crest of the external thread and the root of the internal thread or between the root of the external thread and the crest of the internal thread depending on their dimensional tolerances, which can sometimes, lead to the leakage of fluids. Therefore, sealing tape or sealing compound is applied on the external threads to secure the desired tightness. Not designed to secure tightness by itself, on the other hand, the parallel pipe threads G are commonly used with separate sealing members.

In the case where the nominal designations of the screw threads are different from each other, even if their nominal diameters are the same, the basic thread profiles differ from each other in thread pitch, outside diameter, effective diameter, root diameter, angle of thread, roundness of thread crest and root and other dimensional parameters. They secure tightness in different ways, too. As such, threads of different types even if they are designated by the same nominal diameter, usually do not mesh with each other. Some of them may mesh together, but, even so, they do not provide adequate tightness.

When connecting pipes to fluid apparatuses involving different types of pipe threads, therefore, it has been necessary to prepare as many different types of matching pipe joints. This need has increased not only the stock control cost burden of both markers and users but also the incidence of sealing troubles due to misuse and the like.

Two pipe joints illustrated in FIG. 6 show that the length of engagement between a tapered thread 3 cut on a pipe joint 1 and a fluid apparatus 2 can vary if the dimensional tolerance of the thread and the position of the gauge plane on the thread-cutting machine vary. Variation the gauge plane on the thread-cutting machine vary. Variations in the engaging length also occurs when the fitting is tightened with a different number of turns. For this reason, conventional tapered threads have been cut over a longer length than is otherwise required in order to secure the desired tightness. This longer thread design has resulted in higher production cost, increased fitting difficulty in narrow spaces and more for man-hours for attachment.

Generally, in addition, over-tightening is considered preferable to inadequate tightness due to under-tightening. To secure the desired tightness and prevent loosening, therefore, tapered pipe threads usually tend to become over-tightened beyond the position of gauge planes where the diameters of the meshed external and internal threads coincide.

Over-tightening, however, often squeezes out the sealing compound etc. filled between the meshed threads, thereby bringing the thread faces into direct contact with each other or causes them to stick under the influence of pressure or frictional heat. The thrust exceeding the strength of the material on which threads are cut sometimes breaks the face of threads, generating chips and other fine particles by grinding or friction which sometimes penetrate into pipes through the tip of external threads.

SUMMARY OF THE INVENTION

A primary object of this invention is to provide a pipe joint for apparatuses processing fluids, controlling the flow of fluids or actuated by the pressure of fluids which is adapted to closely fit any of the pipe threads of different types having the same nominal diameter.

Another object of this invention is to provide a pipe joint of simple structure adapted to fit pipe threads of different types having the same nominal diameter by securing mechanical connection with the thread cut thereon and tightness by means of a sealing member.

Still another object of this invention is to provide sealing means that assures easy and effective sealing with the pipe joints of the type described above that are adapted to fit pipe threads of different types having the same nominal diameter.

In order to achieve the above objects, a pipe joint of this invention comprises a screw-in portion.

an external thread being cut on the outer surface of the screw-in portion having a thread profile which can mesh with the innermost among the thread profiles which are different types of internal pipe threads of the same nominal diameter, axially aligned with the gauge planes thereof positioned at the same point; the axial length of the external thread being reduced to a minimum within the limit that the desired firm mechanical connection is secured;

a contact surface being provided at the base end of the screw-in portion which comes in contact with the surface of the fluid apparatus when the external thread is screwed into the fluid apparatus; a groove being provided next to the contact surface; and a sealing member to seal between the screw-in portion and the fluid apparatus being fit in the groove.

Otherwise, a pipe joint of this invention comprises a screw-on portion, an internal thread being cut on the inner surface of the screw-on portion having a thread profile which can mesh with the outermost among the thread profiles which are different types of external pipe threads of the same nominal diameter, axially aligned with the gauge planes thereof positioned at the same point; the axial length of the internal thread being reduced to a minimum within the limit that the desired firm mechanical connection is secured;

a sealing member being provided between the base end of the internal thread and the foremost end of the pipe thread provided on the fluid apparatus.

A pipe joint comprising as described above can mesh with different types of pipe threads having the same nominal diameter on a fluid apparatus because the external thread profile of the screw-in portion can mesh with the innermost thread of the same nominal diameter and the internal thread profile of the screw-on portion can mesh with the outermost thread of the same nominal diameter as described hereinbefore.

Further, provision of the sealing member to provide a non-leaking union between the fluid apparatus and threaded portion eliminates the need to provide a sealing function to the thread, thereby permitting to reduce the axial length of the thread to a minimum.

DESCRIPTION OF THE PREFERRED EMBODIMENTS

Figure 1:
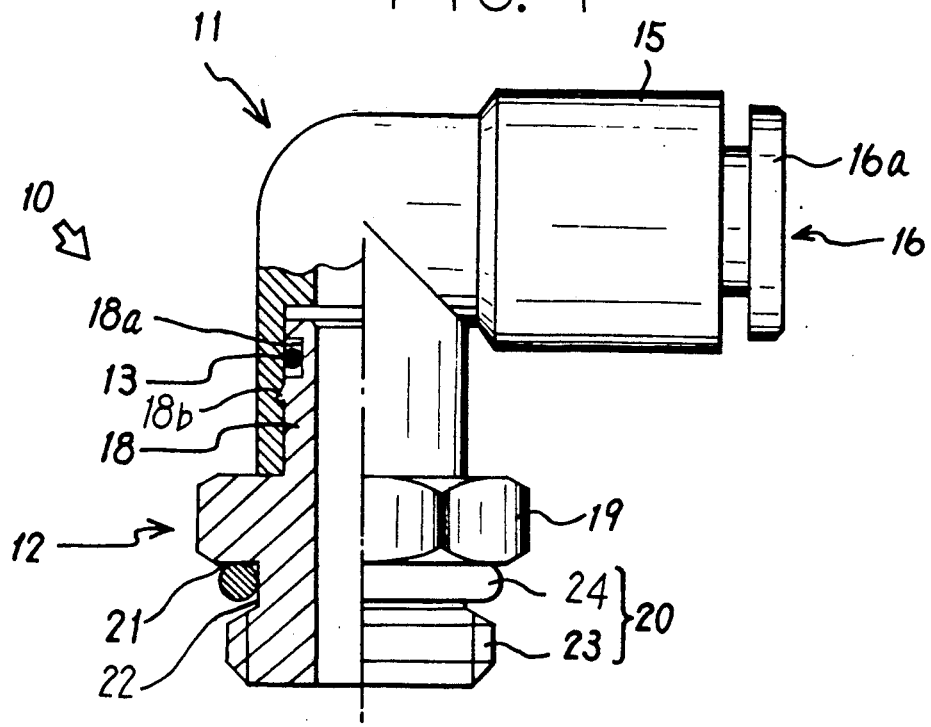
FIG. 1 is a front view of a first preferred embodiment of this invention, with a principal part thereof cut open.

FIG. 1 shows a first preferred embodiment of this invention, which has a multi-fittable external thread that can be screwed into different types of internal threads having a same nominal diameter cut in valves, pneumatic cylinders and other fluid apparatuses. A pipe joint 10 comprises a joint proper 11, a driving half coupling 12 rotatably, but not axially slidably, attached to the joint proper 11, and a sealing O-ring 13 provided between the joint proper 11 and the driving half coupling 12.

The joint proper 11 is an elbow with a one-touch fitting 16 that comprises a tube connecting casing 15 at the opposite end of the driving half coupling 12, a sealing compound and an engaging portion biting into the outer wall of a tube to be connected (both being not shown), and a release member 16a that releases the engaging portion and, as a consequence, the engaged tube when pushed into the tube connecting casing 15. The one-touch fitting 16 is of the type, for example, described in Japanese Utility Model Publication No. 4796-1986. But the pipe joints according to this invention are not limited to elbows; any design will do so long as it permits connection of tube to the joint proper 11.

The driving half coupling 12 comprises a press-in portion 18 that is pressed into an opening of the joint proper 11, with a groove 18a to accommodate the O-ring 13 and a projection 18b that prevents the slip-off the driving half coupling 12 from the joint proper 11, while allowing the rotation thereof, by the engagement of the edge thereof with a groove cut in the inner wall of the joint proper 11, a hexagonal nut-like projection 19 for engagement with a wrench or other turning tool in the middle, and a screw-in portion 20 at the opposite end of the press-in portion.

At the base end of the screw-in portion 20 is provided a contact surface 21 that is pressed against the surface of the fluid apparatus when the screw-in portion 20 is screwed into a pipe thread cut therein. A sealing member 24 to provide a non-leaking union between the fluid apparatus and screw-in portion is fitted in a groove 22 provided next to the contact surface 21. A multi-fittable external thread 23 to be described in the following is cut on the outside surface of the screw-in portion to mesh with the internal pipe thread cut in the fluid apparatus. The axial length of the external thread 23 can be reduced to a minimum within the limit that firm enough connection to withstand the pressure of the transported fluid is secured. The external thread is usually 2 to 4 ribs long. Being very short when compared with the pipe threads provided on fluid apparatuses, the axial length of the external thread 23 by no means offers inconvenience to fitting.

Figure 3:
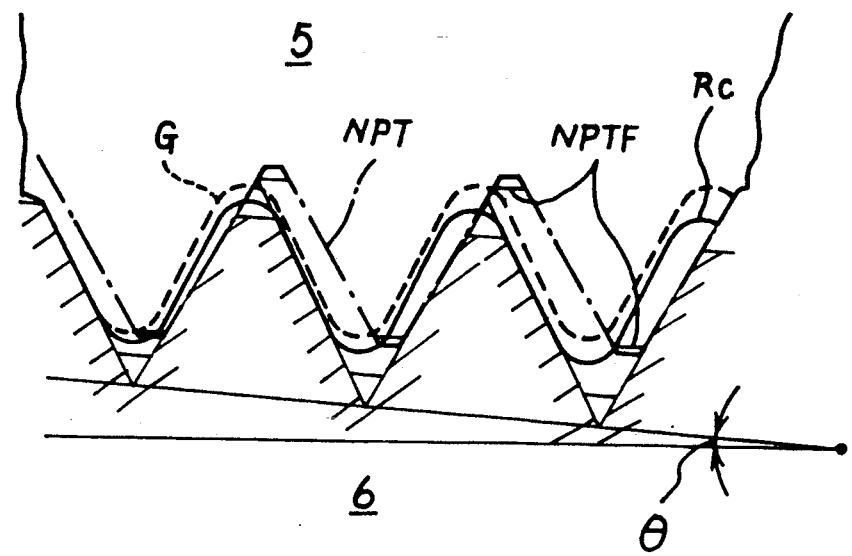
FIG. 3 illustrates the profile of a multi-fittable pipe thread.

FIG. 3 shows a multi-fittable thread that meshes with any of the tapered internal pipe thread Rc, parallel internal thread G, tapered internal thread for U.S. standard pipes NPT and tight tapered internal thread for U.S. standard pipes NPTF.

In FIG. 3, a solid line, which solid line, a dotted line, a dot-dash line and a fine solid line respectively show the standard internal threads Rc, G, NPT and NPTF of the same nominal diameter axially overlapped so that their positions of gauge plane are coincided at the same point, $\theta$ designates an angle slightly greater than ½ of the taper angle of the tapered threads. Dimensional tolerances of the individual threads are specified in their standards. As is obvious from FIG. 3, the profile of the multi-fittable external thread 6 suitable for use with any of the four types of commonly used internal pipe threads must be on the inside of the profiles of the internal threads.

Here, the internal threads Rc and G are identical is the gauge diameter, thread pitch, the angle of thread, and the roundness of thread crest and root. Their difference lies in only one point; while the internal thread G is of the parallel type, the internal thread Rc is tapered, with its diameter narrowing down in the screwing direction. Therefore, the profile of the internal thread G is always on the inside of the profiles of the internal thread Rc. The internal threads NPT and NPTF are identical in pitch angle, taper angle, the angle and height of crest, and effective diameter. Although their major and minor diameters may differ, the minimum major diameter of the internal thread NPTF is smaller than that of the internal thread NPT and larger than that of the internal thread Rc. On the other hand, the minimum minor diameter of the internal thread NPT is very slightly smaller than that of the internal thread NPTF. Therefore, the external thread 6 meshes with the internal thread NPTF if it is designed with the minimum minor diameter of the internal thread NPT in mind.

As such, the profile of the external thread 6 must be on the inside of the profiles of the internal threads Rc and NPT. Triangles defined by the contours of the threads Rc and NPT form a continuous helical rib having a geometrically determined pitch and taper angle. Therefore, the profile, including the height of the crest and the depth of the root, of a multi-fittable external thread suitable for use with the internal threads Rc, G, NPT and NPTF can be designed on the basis of the pitch, taper angle, the angle and height of crest and other parameters thus determined, with the diameter and dimensional tolerances of the standard profiles of the internal threads in mind. The hatched portion in FIG. 3 shows an example of the profile of an external thread thus determined.

The external thread 6 may then take any desired profile so long as it lies on the inside of the profiles of the internal threads Rc and NPT.

The engagement between a multi-fittable external thread thus obtained and an internal thread of different types is not an thorough as the one between external and internal threads of an identical type. But this reduced engagement offers no practical problem as the theoretical ratio of engagement with threads ⅛ to ½ inch in nominal diameter commonly used with pneumatic piping is still as high as over 70 percent. In addition, it has been empirically proven that the shearing strength resulting from the combination of dissimilar threads is more than 30 times greater than the maximum service pressure to which fittings for pneumatic piping are usually subjected.

Figure 2:
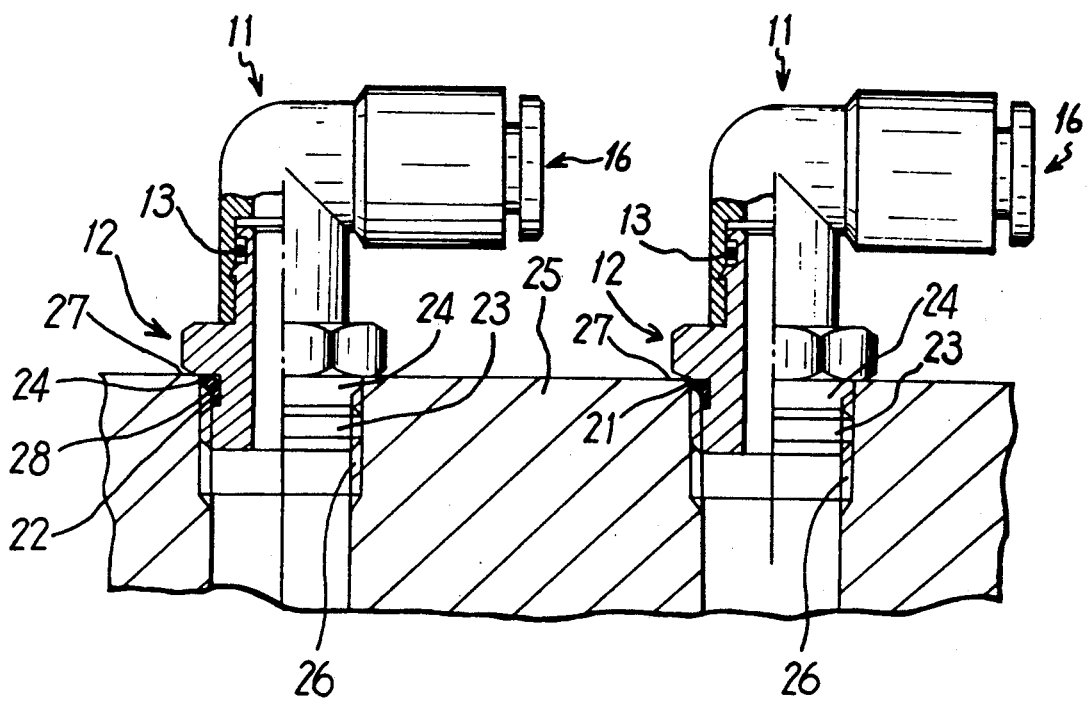
FIG. 2 is a front view showing two pipe joints screwed into a fluid apparatus, with a principal part thereof cut open.

The pipe fitting described above is used as shown in FIG. 2, with the external thread 23 on the screw-in portion 20 screwed into a pipe thread 26 cut in a fluid apparatus 25 and the tube connecting case 15 connected to a tube not shown. When the contact surface 21 comes in contact with the surface 27 of the fluid apparatus 25 where the pipe thread 26 is provided, the sealing member 24 fitted in the groove 22 becomes tightened between the groove 22 and a chamfered surface 28 around the periphery of the pipe thread 26, thereby providing a non-leaking union therebetween. Because of the multi-fittable thread 23, the pipe joint just described can be screwed into any of the different types of pipe threads so long as their nominal diameter is the same. This eliminates the need to stock different types of pipe joints of the same diameter, which, in turn, reduces the stock control cost burden on both makers and users and prevents troubles resulting from misuse.

With the screw-in portion 20 screwed into the pipe thread 26 until the contact surface 21 comes in contact with the surface 27 of the fluid apparatus 25, the sealing member 24 fitted in the groove 22 and tightened between the groove and the chambered surface 28 of the pipe thread 26 provides the desired sealing independently of the screw-in portion. On the other hand, the screw-in portion assures the desired mechanical connection independently of the sealing member providing a non-leaking union. Therefore, there is no need to worry about the provision of sealing around the external thread 23. As a consequence, the axial length of the external thread 23 can be reduced to a minimum, generally 2 to 4 ribs long, so long as strong enough connection to withstand the pressure of the transported fluid is secured. This saves material and working costs, permits fitting in conventionally inaccessible narrow spaces, reduces screw-in manhours, and eliminates the trouble of sealing compound application.

Because the sealing member 24 at the base of the external thread 23 seals the joint between the screw-in portion and the fluid apparatus 25, a plurality of pipe fittings screwed into the fluid apparatus 25 attain a substantially equal height (see FIG. 2), which facilitates alignment with other apparatus to be connected to the pipe joint 10, thus providing a better appearance to the entire assembly.

After coming in contact with the fluid apparatus 25, the contact surface 21 serves as a stopper to limit the further penetration of the external thread 23 into the fluid apparatus 25. This substantially eliminates the possibility of generating a compressive force to cause the sticking of thread faces and breaking thread ribs.

Figure 4:
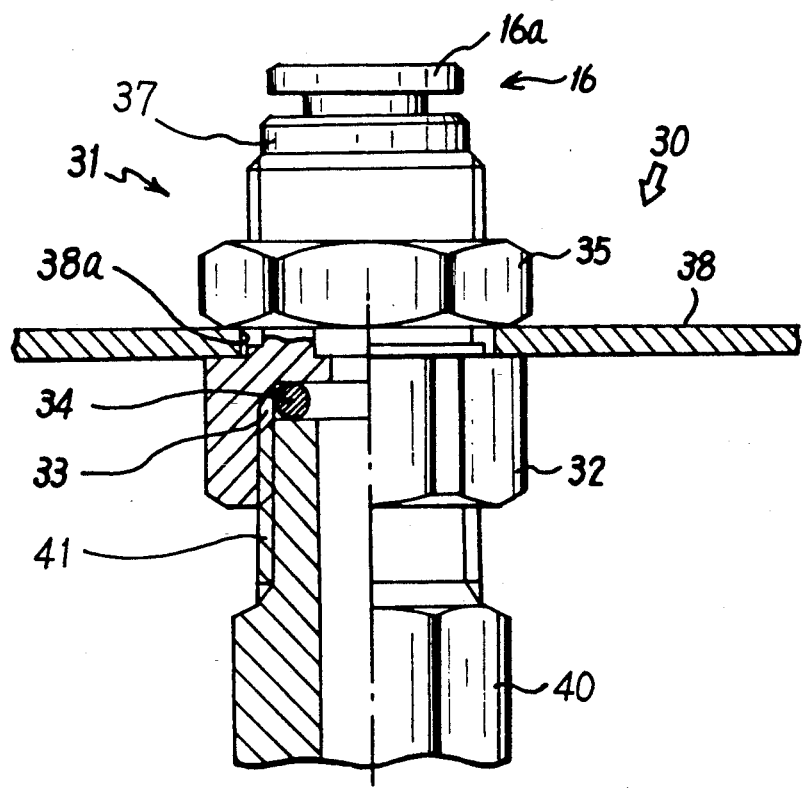
FIG. 4 is a front view of a second preferred embodiment of this invention, with a principal part thereof cut open.

FIG. 4 shows a second preferred embodiment of this invention having a multi-fittable internal thread suitable for use with external threads on a fluid apparatus. This pipe joint 30 comprises a joint proper 31 which, in turn, comprises a tube connecting portion 37 equipped with a one-touch fitting 16 of the type identical to the one used with the first preferred embodiment described before. A multi-fittable internal thread 33 to mesh with an external pipe thread 41 on a tube 40 attached to the fluid apparatus is cut on the inner surface of a screw-on portion 32, with a sealing member 34 provided between the base end thereof and the foremost end of the external thread 41.

The pipe joint 30 is attached to a stationary member 38 by inserting the tube connection portion 37 into a receiving hole 38a, with the shoulder of the screw-on portion 32 positioned against the stationary member 38 and a nut 35 screwed onto the external thread cut on the outer surface of the tube connection portion 37.

Figure 5:
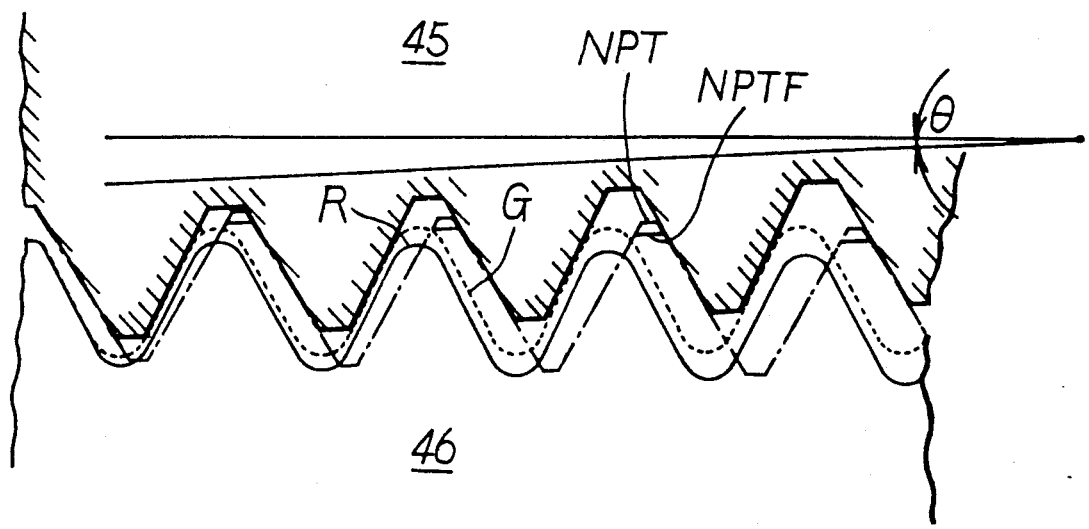
FIG. 5 illustrates the profile of the same nominal size but different pipe threads used with the second preferred embodiment.
Figure 6:
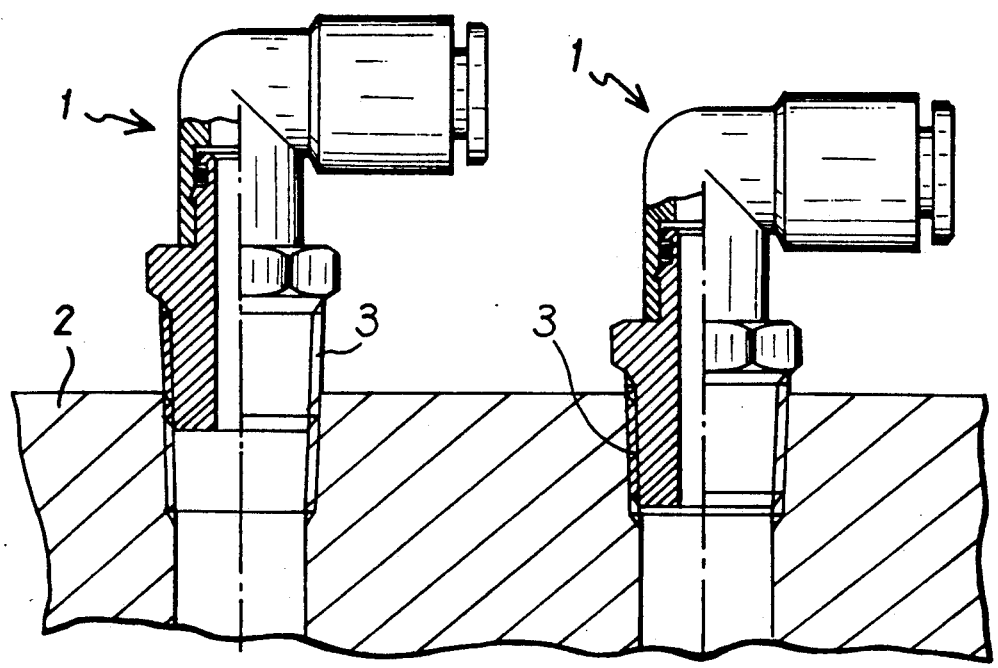
FIG. 6 is a front view showing pipe fittings of the known type fitted in position, with a principal portion thereof cut open.

The multi-fittable internal thread 33 on the screw-on portion 32 of this second preferred embodiment meshes with any of the external threads R, G, NPT and NPTF of the same nominal diameter. The profile of this internal thread can be designed in the same way as done with the external thread described previously by reference to FIG. 3, except that the profiles represented by reference numeral 5 must be considered as those of external threads and the profiles represented by numeral 6 as those of internal threads. In addition, the profile of the internal thread must be on the outside of the profile of the external thread. FIG. 5 is a view similar to FIG. 3, in which an example of the profile of the multi-fittable internal thread 33 is shown, with reference numerals 45 and 46 respectively designating an internal and an external thread.

What is claimed is:

1. In a pipe joint having a screw-in portion adapted to be screwed into a pipe thread provided on a fluid apparatus, the improvement which comprises:
   an external thread being out in an outer surface of the screw-in portion to provide a continuous helical rib forming at least one crest and root which can mesh with an innermost complementary root and crest of different types of internal pipe threads of a same nominal diameter including at least Rc, G, NPTF and NPT type threads, an axial length of the screw-in portion provided with the external thread being reduced to a minimum within a limit that the desired firm mechanical connection is secured;
   a contact surface being provided at a base of the screw-in portion which comes in contact with a surface of the fluid apparatus when the external thread is screwed into the fluid apparatus;

a groove being provided next to the contact surface; and a sealing member, to seal between the screw-in portion and the fluid apparatus, being fit in the groove;

wherein the external thread is provided with a maximum minor diameter substantially equal to a minimum minor diameter of the Rc type thread and a maximum major diameter substantially equal to a minimum major diameter of the Rc type thread.

2. The improvement according to claim 1, in which the rib of the external thread has approximately 2 to 4 crests.

3. The improvement according to claim 1, in which an O-ring is used as the sealing member.

4. In a pipe joint having a screw-on portion adapted to be screwed onto a pipe thread provided on a fluid apparatus, the improvement which comprises:

an internal thread being cut in an inner surface of the screw-on portion to form a continuous helical rib having at least one crest and root which can mesh with an outermost complementary root and crest of different types of external pipe threads of a same nominal diameter including at least Rc and NPT type threads, an axial length of the screw-on portion provided with the internal thread being reduced to a minimum within a limit that the desired firm mechanical connection is secured;

a sealing member being provided at a base end of the internal thread and a foremost end of the pipe thread provided on the fluid apparatus;

wherein the at least one crest of the internal thread is formed to engage crests of both the NPT type thread and the R type thread.

5. The improvement according to claim 4, in which the rib of the internal thread has 2 to 4 crests.

6. The improvement according to claim 4, in which an O-ring is used as the sealing member.

* * * * *

UNITED STATES PATENT AND TRADEMARK OFFICE
CERTIFICATE OF CORRECTION

PATENT NO. : 5,165,731
DATED      : November 24, 1992
INVENTOR(S): Yasuhito Kimura It is certified that error appears in the above-identified patent and that said Letters Patent is hereby corrected as shown below:

On the title page, Item [75],

The inventor's name is spelled incorrectly, should be,

--Yasuhito Kimura--

Signed and Sealed this

Twelfth Day of October, 1993

Attest:

BRUCE LEHMAN

*Attesting Officer*     *Commissioner of Patents and Trademarks*